United States Patent
Baier et al.

(10) Patent No.: US 8,214,455 B2
(45) Date of Patent: Jul. 3, 2012

(54) HUMAN-MACHINE INTERFACE SUPPORT OF REMOTE VIEWING SESSIONS

(75) Inventors: John Joseph Baier, Mentor, OH (US); Kevin George Gordon, Vancouver (CA); Mark David Hobbs, Hartford, WI (US); Monte Leroy Fevang, Surrey (CA); Teunis Hendrik Schouten, Langley (CA); Karen Kui, Surrey (CA)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 31 days.

(21) Appl. No.: 12/948,544

(22) Filed: Nov. 17, 2010

(65) Prior Publication Data
US 2011/0066261 A1  Mar. 17, 2011

Related U.S. Application Data

(63) Continuation of application No. 12/242,740, filed on Sep. 30, 2008, now Pat. No. 7,860,944.

(51) Int. Cl.
*G06F 15/16* (2006.01)
(52) U.S. Cl. ........ 709/217; 709/218; 709/219; 709/220; 709/223; 709/224; 709/226; 709/229
(58) Field of Classification Search .................. 709/217, 709/218, 219, 220, 223, 224, 226, 229
See application file for complete search history.

(56) References Cited

U.S. PATENT DOCUMENTS

| | | | |
|---|---|---|---|
| 6,201,996 B1* | 3/2001 | Crater et al. ...................... 700/9 |
| 6,587,125 B1* | 7/2003 | Paroz ............................. 715/740 |
| 6,587,884 B1* | 7/2003 | Papadopoulos et al. ...... 709/230 |
| 7,058,693 B1* | 6/2006 | Baker, Jr. ...................... 709/217 |
| 7,146,408 B1* | 12/2006 | Crater et al. .................. 709/219 |
| 7,664,869 B2* | 2/2010 | Baker et al. ................... 709/230 |
| 2002/0067370 A1 | 6/2002 | Forney et al. |
| 2002/0123864 A1 | 9/2002 | Eryurek et al. |
| 2002/0163427 A1 | 11/2002 | Eryurek et al. |
| 2004/0230328 A1 | 11/2004 | Armstrong et al. |
| 2006/0217881 A1* | 9/2006 | Pei et al. ....................... 701/208 |
| 2008/0104189 A1* | 5/2008 | Baker et al. ................... 709/206 |

* cited by examiner

*Primary Examiner* — Liangche A Wang

(57) ABSTRACT

A human-machine-interface (HMI) system comprises a machine interface, a communication interface, and a processing system. The machine interface receives operation data from a plurality of machines within an industrial automation environment, wherein the operation data corresponds to operations of the plurality of machines. The communication interface receives a request for a remote viewing session from a communication device, and in response to the request, transfers graphics data and the operation data for delivery to and display by the communication device. The processing system monitors for changes to the graphics data and the operation data during the remote viewing session. The communication, upon a change occurring to the graphics data, transfers updated graphics data for delivery to and display by the communication device, and upon a change occurring to the operation data, transfers updated operation data for delivery to and display by the communication device.

20 Claims, 7 Drawing Sheets

HUMAN-MACHINE INTERFACE SUPPORT OF REMOTE VIEWING SESSIONS

RELATED APPLICATIONS

This application is a continuation of and claims priority to U.S. patent application Ser. No. 12/242,740, filed on Sep. 30, 2008, and entitled AGGREGATION SERVER WITH INFORMATION VISUALIZATION PANEL SUBSCRIPTION MODEL, and which is hereby incorporated by reference in its entirety.

TECHNICAL FIELD

This disclosure is related to the field of factory automation, and in particular, to aggregation of industrial automation data.

TECHNICAL BACKGROUND

Industrial automation environments include automobile manufacturing factories, food processing plants, and microprocessor fabrication facilities. The typical industrial environment includes various machines, such as pumps, motors, and robots. These machines continually produce data that indicates the current status of the machines, such as the machine's pressure, temperature, or speed.

The typical industrial environment also includes a Human-Machine Interface (HMI). The HMI can display a graphical representation of an industrial automation environment, including graphical representations of machines. The HMI also receives and processes operation data from the machines to generate various graphical displays. The graphical displays indicate the current and historical status of the machines. For example, an HMI graphical display might indicate the pressure of a pump, the speed of a motor, or the output of a robot.

A user may remotely operate a communication device to access a communication network of an industrial automation environment. The communication device functions as a remote HMI and retrieves operation data from the machines and graphics data from the HMI over a communication network. Unfortunately, frequent requests for such data from multiple communication devices puts strain on the HMI, the machines, and the network.

TECHNICAL SUMMARY

Disclosed herein are human-machine-interface (HMI) systems, software, products, and methods of operating.

In an example, an HMI system comprises a machine interface, a communication interface, and a processing system. The machine interface receives operation data from a plurality of machines within an industrial automation environment, wherein the operation data corresponds to operations of the plurality of machines. The communication interface receives a request for a remote viewing session from a communication device, and in response to the request, transfers graphics data and the operation data for delivery to and display by the communication device. The processing system monitors for changes to the graphics data and the operation data during the remote viewing session. The communication, upon a change occurring to the graphics data, transfers updated graphics data for delivery to and display by the communication device, and upon a change occurring to the operation data, transfers updated operation data for delivery to and display by the communication device.

In an example, a method of operating a human-machine-interface (HMI) system within an industrial automation environment comprises receiving a request for a remote viewing session generated by a communication device, in response to the request, transferring graphics data and operation data for delivery to and display by the communication device, monitoring for changes to the graphics data and the operation data during the remote viewing session, upon a change occurring to the graphics data, transferring updated graphics data for delivery to and display by the communication device, and upon a change occurring to the operation data, transferring updated operation data for delivery to and display by the communication device.

In another example, an HMI product, for operating an HMI system, comprises machine-readable processing instructions that when executed by the HMI system, direct the HMI system to receive operation data from a plurality of machines within an industrial automation environment, wherein the operation data corresponds to operations of the plurality of machines, receive a request for a remote viewing session from a communication device, and in response to the request, transfer graphics data and the operation data for delivery to and display by the communication device, monitor for changes to the graphics data and the operation data during the remote viewing session, upon a change occurring to the graphics data, transfer updated graphics data for delivery to and display by the communication device, and upon a change occurring to the operation data, transfer updated operation data for delivery to and display by the communication device.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Described herein is a method of operating a data aggregation system. An aggregation server is placed in communication with a Human-Machine Interface (HMI) system and machine systems. Requests for operation data and graphics data from remote communication devices are serviced by the aggregation server. Upon receiving a request for operation data and graphics data from a remote communication device, the aggregation server requests such data from the HMI or the machine systems. Any subsequent requests for the data from other communication devices are serviced by the aggregation server. Thus, by utilizing the aggregation server, the HMI and machine systems may not be required to provide the data to communication devices on demand. Additionally, strain on enterprise network resources is reduced through use of the aggregation server.

Figure 1:
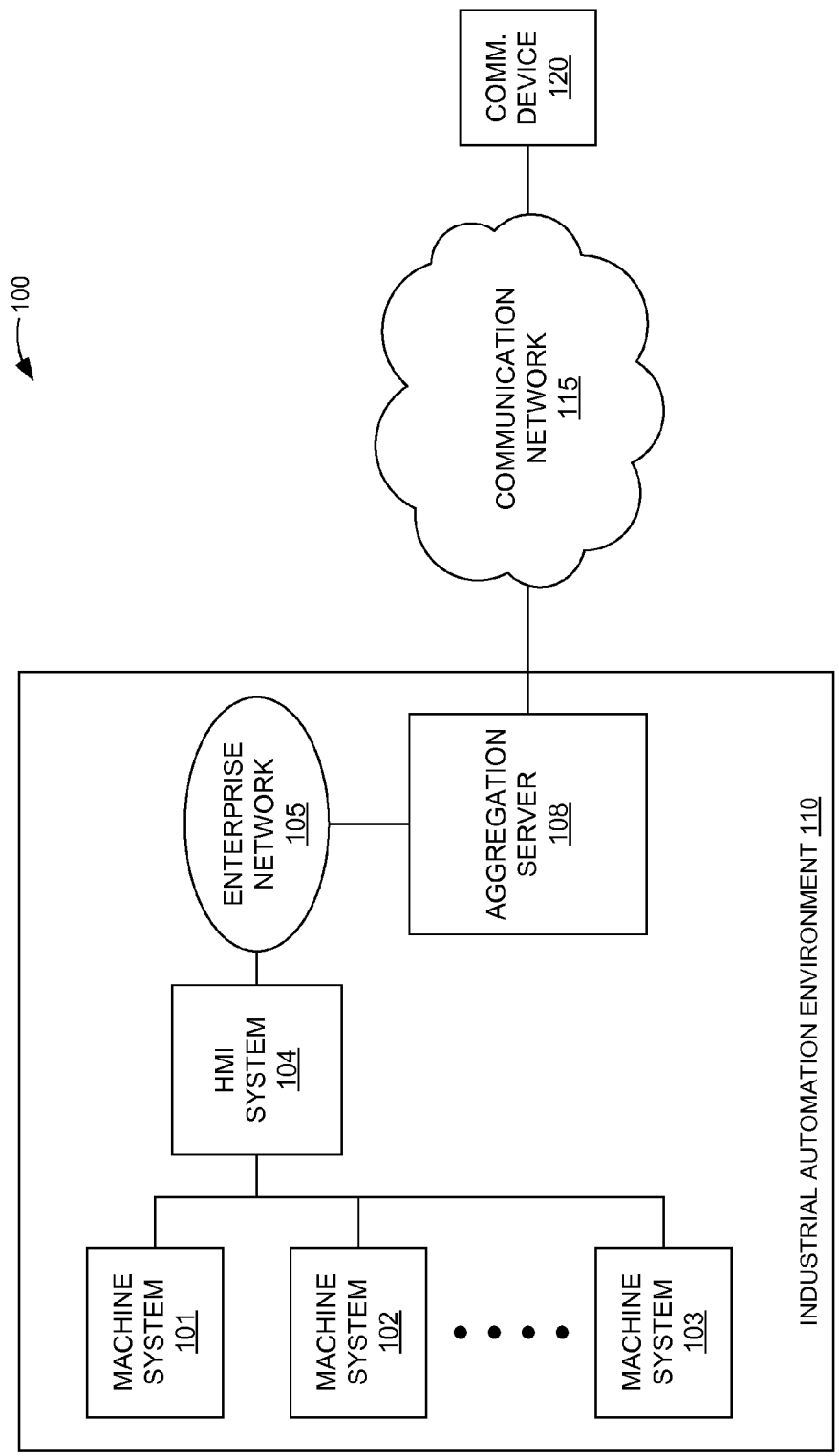
FIG. 1 is a block diagram illustrating a data aggregation system.

FIG. 1 is a block diagram illustrating data aggregation system 100. Data aggregation system 100 comprises machine systems 101-103, Human-Machine Interface (HMI) system 104, enterprise network 105, aggregation server 108, communication network 115, and communication device 120. The number of machine systems, HMI systems, and communication devices shown in FIG. 1 has been restricted for clarity, but there would typically be many more. HMI system 104 and aggregation server 108 communicate over enterprise network 105. Aggregation server 108 and communication device 120 communicate over communication network 115.

Industrial automation environment 110 includes machine systems 101-103, HMI system 104, enterprise network 105, and aggregation server 108. Industrial automation environment 110 comprises an automobile manufacturing factory, food processing plant, microprocessor fabrication facility, or some other type of industrial enterprise. Note that aggregation server 108 may not be located at the same physical premises as machine systems 101-103, but may be in communication with HMI system 104 over enterprise network 105 from many miles away.

Machine systems 101-103 comprise pumps, motors, robots, or some other mechanical apparatus, including their associated control systems. A control system comprises, for example, a programmable logic controller (PLC). In addition, machine systems 101-103 comprise other, non-mechanical elements, such as a brew kettle in a brewery, a reserve of coal or other resources, or any other element that may reside in an industrial automation environment 110.

Machine systems 101-103 continually produce operation data over time. The operation data indicates the current status of machine systems 101-103, such as pressure, temperature, speed, or some other status metrics. Machine systems 101-103 are in communication with HMI system 104 and continually transfer the operation data to HMI system 104 over wireless links, metallic links, optical links, or some other communication link, including combinations thereof. In addition, HMI system 104 transfers control instructions to machine systems 101-103.

HMI system 104 comprises computer and communication equipment and software. HMI system 104 displays graphics data comprising a graphical representation of an industrial automation environment 110, including graphical representations of machine systems 101-103. HMI system 104 also continually receives operation data from machine systems 101-103. HMI system 104 may process the operation data to generate various graphical displays indicating the current and historical status of machine systems 101-103. Such graphical displays are a graphical representation of the operation data. For example, an HMI system 104 graphical display might indicate the pressure of a pump, the speed of a motor, the output of a robot, the amount of coal remaining, or some other status metric. HMI system 104 also controls machine systems 101-103. For example, HMI system 104 might turn on a pump, speed-up a motor, stop a robot, boil a brew kettle, or perform some other type of machine control. Examples of HMI systems that could be adapted in accord with this description comprise RSView® or PanelView Plus™ supplied by Rockwell Automation—including combinations thereof.

HMI system 104 comprises a machine interface, a processing system, a storage system, a user interface, a communication interface, and a communication system. The user interface includes a display device. The storage system stores HMI software.

The machine interface comprises communication circuitry and equipment that communicates with machine systems 101-103. The processing system comprises microprocessors or other logic circuitry that retrieves and executes the HMI software. The communication interface comprises communication circuitry and equipment that communicates with aggregation server 108 over enterprise network 105. The user interface comprises a keyboard, mouse, voice recognition interface, touch screen, touch pad, or some other user device. The display device comprises a touch screen, liquid crystal display, cathode ray tube display, or some other graphical display mechanism. The storage system comprises a disk, integrated circuit, flash drive, optical media, or some other memory device. The communication system comprises a bus, local area network, or some other communication apparatus. The above-described components of HMI system 104 may be integrated together or distributed among multiple devices.

The HMI software comprises an application program, firmware, or some other form of machine-readable processing instructions. The HMI software may include an operating system, utilities, drivers, networking, and applications. When executed by the processing system, the HMI software directs HMI system 104 to operate as described herein.

Enterprise network 105 uses the internet protocol, Ethernet, telephony, or some other communication protocol, including combinations thereof. Enterprise network 105 uses wireless links, metallic links, optical links, or some other communication link, including combinations thereof. Enterprise network 105 comprises the Internet, a private network, a telephone network, or some other communication network, including combinations thereof. Enterprise network 105 could be a local area network, wide area network, or some other data network. HMI system 104 communicates with aggregation server 108 over enterprise network 105.

Aggregation server 108 comprises computer and communication equipment and software. Aggregation server 108 can receive and store graphics data and operation data from HMI system 104 over enterprise network 105. Graphics data comprises a graphical representation of an industrial automation environment, including graphical representations of machine systems 101-103. Aggregation server 108 receives a request over communication network 115 from communication device 120 for graphics data and operation data. In response to the request from communication device 120, aggregation server 108 requests the graphics data and the operation data from HMI system 104 and stores the data upon receipt. Aggregation server 108 sends the graphics data and the operation data over communication network 115 to communication device 120. An example of an aggregation server that could be adapted in accord with this description is a FactoryTalk® ViewPoint server supplied by Rockwell Automation.

In one embodiment, HMI system 104 monitors changes to the operation data and the graphics data. If a communication device issues a subsequent request to aggregation server 108 for the graphics data and the operation data, aggregation server 108 communicates with HMI system 104 to determine if the data presently stored in aggregation server 108 is still current. If HMI system 104 reports that the data is unchanged, aggregation server 108 sends the graphics data and operation data stored in aggregation server 108 from a prior request to the communication device requesting such data. However, if HMI system 104 reports a change in either the operation data or graphics data, aggregation server 108 requests updated data from HMI system 104 corresponding to the operation data or graphics data that has changed since last stored in aggregation server 108. Aggregation server 108 then sends the updated data to the communication device requesting such data.

In another embodiment, HMI system 104 only monitors changes to the operation data and the graphics data if aggregation server 108 informs HMI system 104 that aggregation server 108 is actively engaged in a viewing session with a communication device, such as communication device 120. HMI system 104 could also infer that a viewing session has commenced when aggregation server 108 first requests graphics data or operation data, thus signaling HMI system 104 to begin monitoring changes between the current graphics data or operation data and the graphics data or operation data stored on aggregation server 108.

In yet another embodiment, aggregation server 108 is programmed to limit the number of simultaneous requests for graphics data and operation data from HMI system 104. For example, if two communication devices simultaneously send two requests for different graphics data to aggregation server 108, aggregation server 108 does not simultaneously request both graphics data from HMI system 104. Instead, to avoid overloading HMI system 104 with multiple simultaneous requests for data, aggregation server 108 first requests only the data for the first communication device. Aggregation server 108 then waits to receive the requested data from HMI system 104 prior to requesting the data requested by the second communication device. In one embodiment, aggregation server 108 controls simultaneous requests from multiple communication devices by placing the requests in a queue.

Communication network 115 uses the internet protocol, Ethernet, telephony, or some other communication protocol, including combinations thereof. Communication network 115 uses wireless links, metallic links, optical links, or some other communication link, including combinations thereof. Communication network 115 comprises the Internet, a private network, a telephone network, or some other communication network, including combinations thereof. Aggregation server 108 communicates with communication device 120 over communication network 115.

Communication device 120 comprises a telephone, wireless transceiver, computer, digital assistant, Internet appliance, or some other communication apparatus. Communication device 120 receives operation data and graphics data from aggregation server 108. Communication device 120 displays the operation data and graphics data. In addition, communication device 120 may process the operation data to generate graphical representations of the operation data. In one embodiment, communication device 120 comprises a computer with an Internet browser and Microsoft® Silverlight™ software installed thereon.

Communication device 120 comprises a communication interface, processing circuitry, a storage device, a user interface, and a communication system. The user interface includes a display device. The storage device stores communication device software.

The communication interface comprises communication circuitry and equipment that communicates with aggregation server 108 over communication network 115. The processing circuitry comprises microprocessors or other logic circuitry that retrieves and executes the communication device software. The storage device comprises a disk, integrated circuit, flash drive, or some other memory device. The user interface comprises a keyboard, mouse, voice recognition interface, touch screen, or some other user device. The user interface may also include a touch pad, wheel, or some other mechanism that allows a user to input a scroll command. The display device comprises a liquid crystal display, cathode ray tube display, or some other graphical display mechanism. The communication system comprises a bus, communication circuitry, or some other communication apparatus. The above-described components of communication device 120 may be integrated together or distributed among multiple devices.

The communication device software comprises an application program, firmware, or some other form of machine-readable processing instructions. The communication device software may include an operating system, utilities, drivers, networking, and applications. When executed by the processing circuitry, the communication device software directs communication device 120 to operate as described herein.

Figure 2:
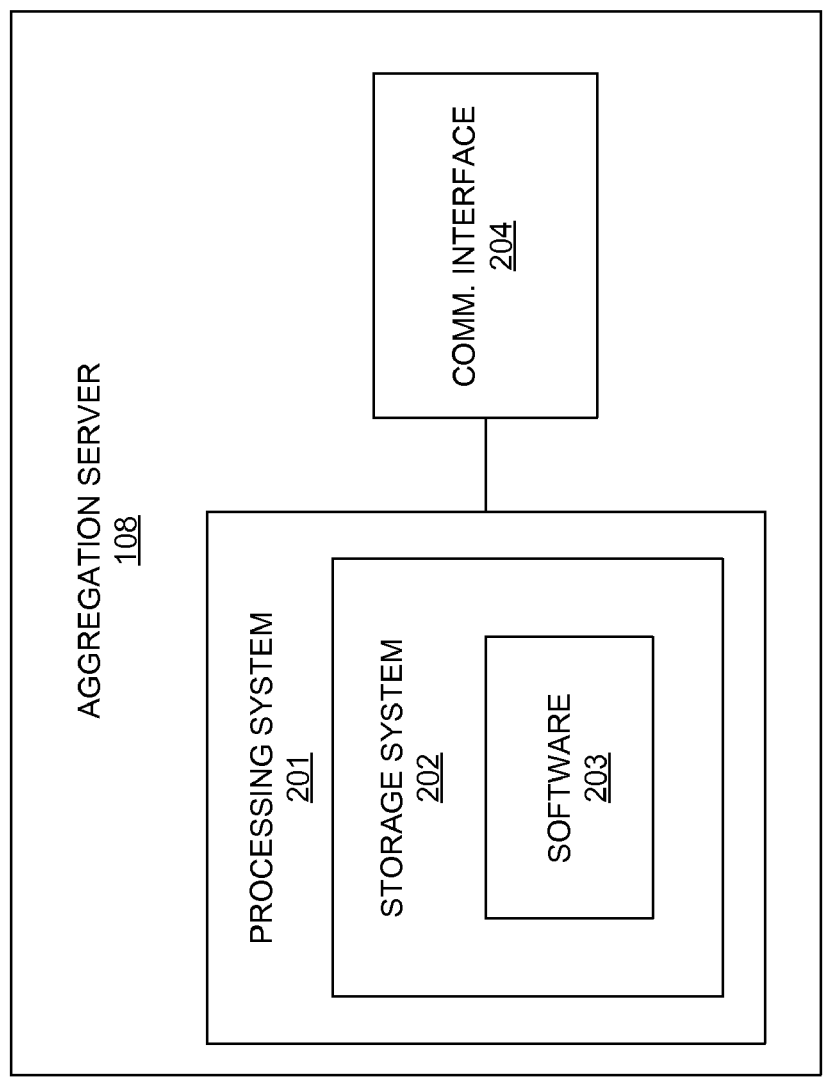
FIG. 2 is a block diagram illustrating an aggregation server.

FIG. 2 is a block diagram illustrating aggregation server 108. Aggregation server 108 comprises communication interface 204 and processing system 201. Processing system 201 includes storage system 202. Storage system 202 stores software 203. Processing system 201 is linked to communication interface 204. Aggregation server 108 could be comprised of a programmed general-purpose computer, although those skilled in the art will appreciate that programmable or special purpose circuitry and equipment may be used. Aggregation server 108 may be distributed among multiple devices that together comprise elements 201-204.

Communication interface 204 could comprise a network interface, modem, port, transceiver, or some other communication device. Communication interface 204 may be distributed among multiple communication devices. Processing system 201 could comprise a computer microprocessor, logic circuit, or some other processing device. Processing system 201 may be distributed among multiple processing devices. Storage system 202 could comprise a disk, tape, integrated circuit, server, or some other memory device. Storage system 202 may be distributed among multiple memory devices.

Processing system 201 retrieves and executes software 203 from storage system 202. Software 203 may comprise an operating system, utilities, drivers, networking software, and other software typically loaded onto a computer system. Software 203 could comprise an application program, firmware, or some other form of machine-readable processing instructions. When executed by processing system 201, software 203 directs aggregation server 108 to operate as described herein.

Figure 3:
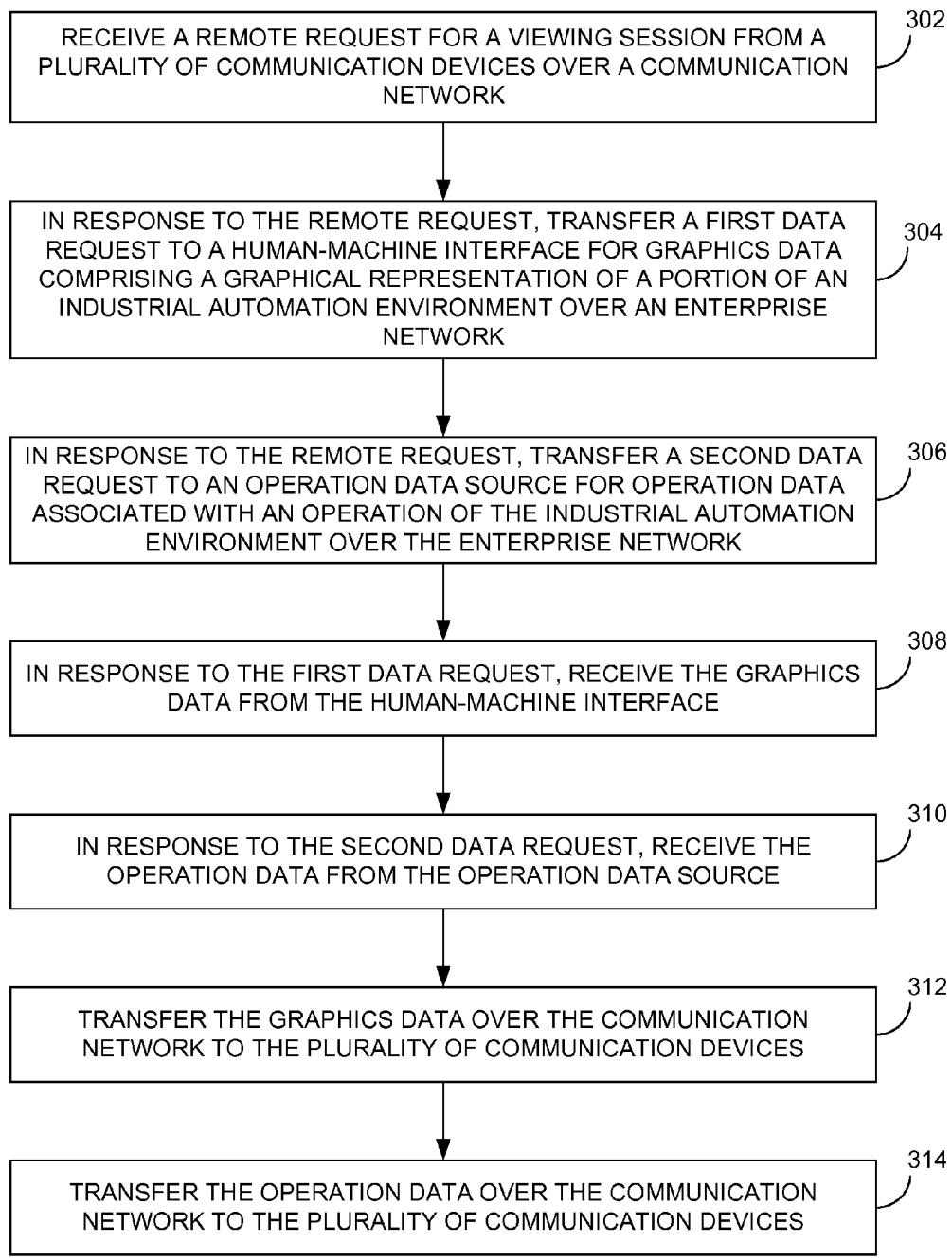
FIG. 3 is a flow diagram illustrating a method of operating an industrial automation environment.

FIG. 3 is a flow diagram illustrating a method of operating a data aggregation system, such as data aggregation system 100. Aggregation server 108 receives a remote request for a viewing session from a plurality of communication devices over a communication network 115 (operation 302). A viewing session comprises receiving either graphics data or operation data, or both, on a remote communication device, such as communication device 120. A viewing session comprises identifying a view of at least an operation of a machine system, such as one of machine systems 101-103.

In response to the remote request, aggregation server 108 transfers a first data request to HMI system 104 for graphics data comprising a graphical representation of a portion of an industrial automation environment over an enterprise network 105 (operation 304). For example, the graphics data may comprise a graphical representation of machine systems 101-103 of industrial automation environment 110. Also in response to the remote request, aggregation server 108 transfers a second data request to an operation data source for operation data associated with an operation of the industrial automation environment over enterprise network 105 (operation 306). The operation data indicates the current status of machine systems 101-103, such as pressure, temperature, speed, or some other status data. In one embodiment, the operation data source comprises HMI system 104. In another embodiment, the operation data source comprises a machine system, such as one of machine systems 101-103.

In response to the first data request, aggregation server 108 receives the graphics data from HMI system 104 (operation 308). In response to the second data request, aggregation server 108 receives the operation data from the operation data source (operation 310). In one embodiment, aggregation server 108 receives the operation data from HMI system 104. In another embodiment, aggregation server 108 receives the operation data from a machine system, such as one of machine systems 101-103.

Aggregation server 108 transfers the graphics data over communication network 115 to the plurality of communication devices (operation 312). Aggregation server 108 also transfers the operation data over communication network 115 to the plurality of communication devices (operation 314). In this manner, the plurality of communication devices receive the data requested without ever communicating with HMI system 104 or machine systems 101-103.

Figure 4:
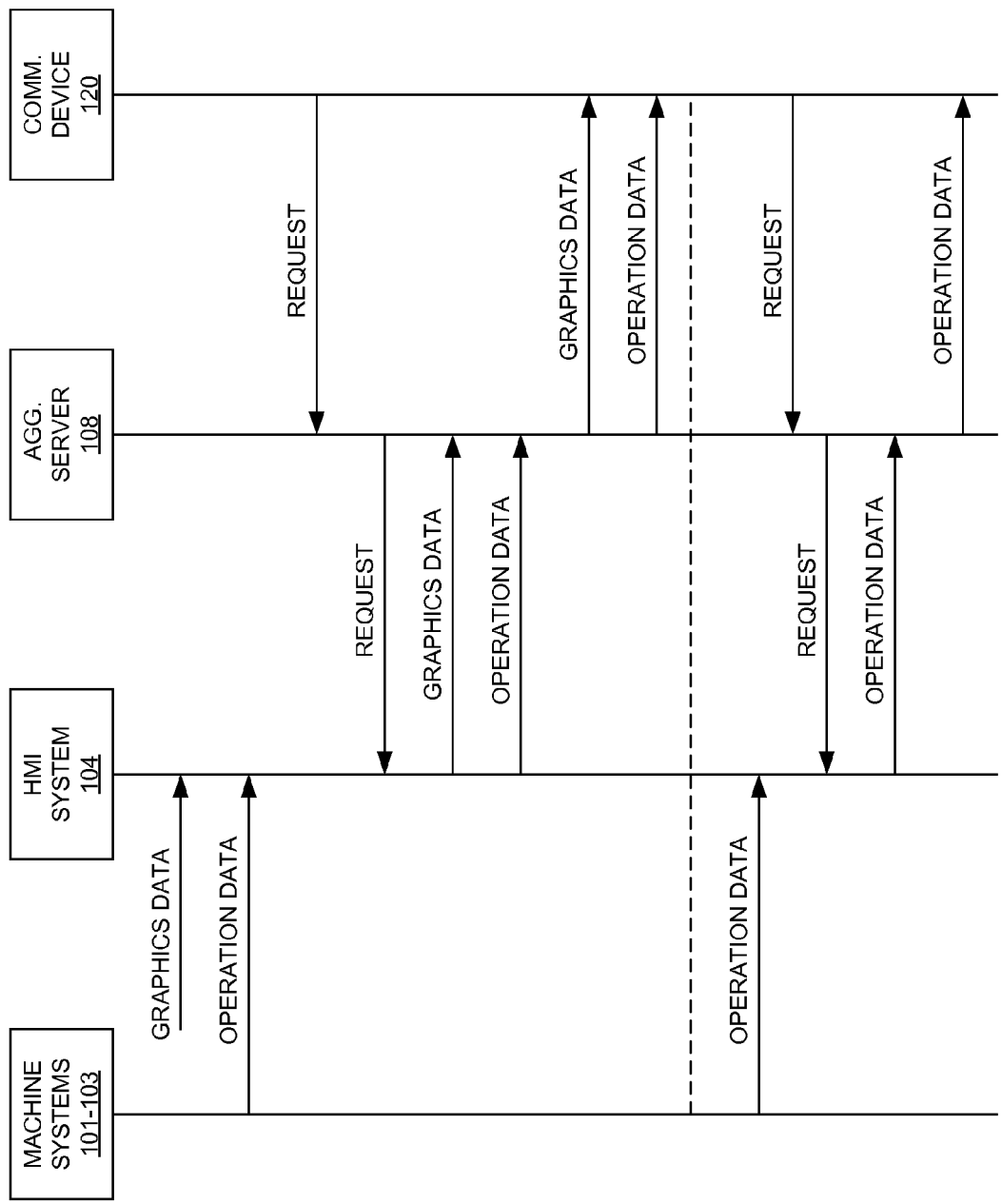
FIG. 4 is a sequence diagram illustrating a method of operating a data aggregation system.

FIG. 4 is a sequence diagram illustrating a method of operating data aggregation system 100. HMI system 104 receives graphics data in a variety of ways. For example, HMI system 104 might have various programmed display configurations representing different views of industrial automation environment 110 and machine systems 101-103. An operator of HMI system 104 might change a display configuration on HMI system 104. In another example, an operator might change the display configuration of HMI system 104 using communication device 120. In the examples listed above, HMI system 104 receives graphics data when an operator changes a display configuration of HMI system 104.

Machine systems 101-103 generate operation data, and transfer the operation data to HMI system 104. HMI system 104 may process the operation data to generate graphical displays that indicate the status of machine systems 101-103.

A user desires to conveniently view graphics data and operation data from a remote communication device. The user operates communication device 120 to request a viewing session from aggregation server 108. In response to the request for the viewing session, aggregation server 108 requests the latest graphics data and operation data from HMI system 104. In response to the requests for the graphics data and operation data, HMI system 104 sends the graphics data and the operation data to aggregation server 108. Aggregation server 108 then transfers the graphics data and the operation data to communication device 120.

At a later point in time (represented by the dashed line in FIG. 4), machine systems 101-103 generate new operation data, and transfer the new operation data to HMI system 104. The graphics data has not changed, so HMI system does not receive new graphics data.

The user operates communication device 120 to request a viewing session from aggregation server 108. In response to the request for the viewing session, aggregation server 108 requests updated graphics data and operation data from HMI system 104. In response to the requests for the graphics data and operation data, HMI system 104 sends the new operation data to aggregation server 108. In this example, the graphics data has not changed since aggregation server 108 last received the graphics data, so HMI system 104 does not send graphics data to aggregation server 108 at this time. Aggregation server 108 then transfers the new operation data to communication device 120.

In one embodiment, HMI system 104 monitors changes to the operation data and the graphics data. If a communication device issues a subsequent request to aggregation server 108 for the graphics data and the operation data, aggregation server 108 communicates with HMI system 104 to determine if the data presently stored in aggregation server 108 is still current. In another embodiment, aggregation server 108 informs HMI system 104 whenever a communication device initiates a viewing session and terminates the viewing session, allowing HMI system 104 to only monitor changes to the graphics data and the operation data while aggregation server 108 is actively engaged in a viewing session with a communication device, such as communication device 120. HMI system 104 could also infer that a viewing session has commenced when aggregation server 108 requests graphics and operation data.

Figure 5:
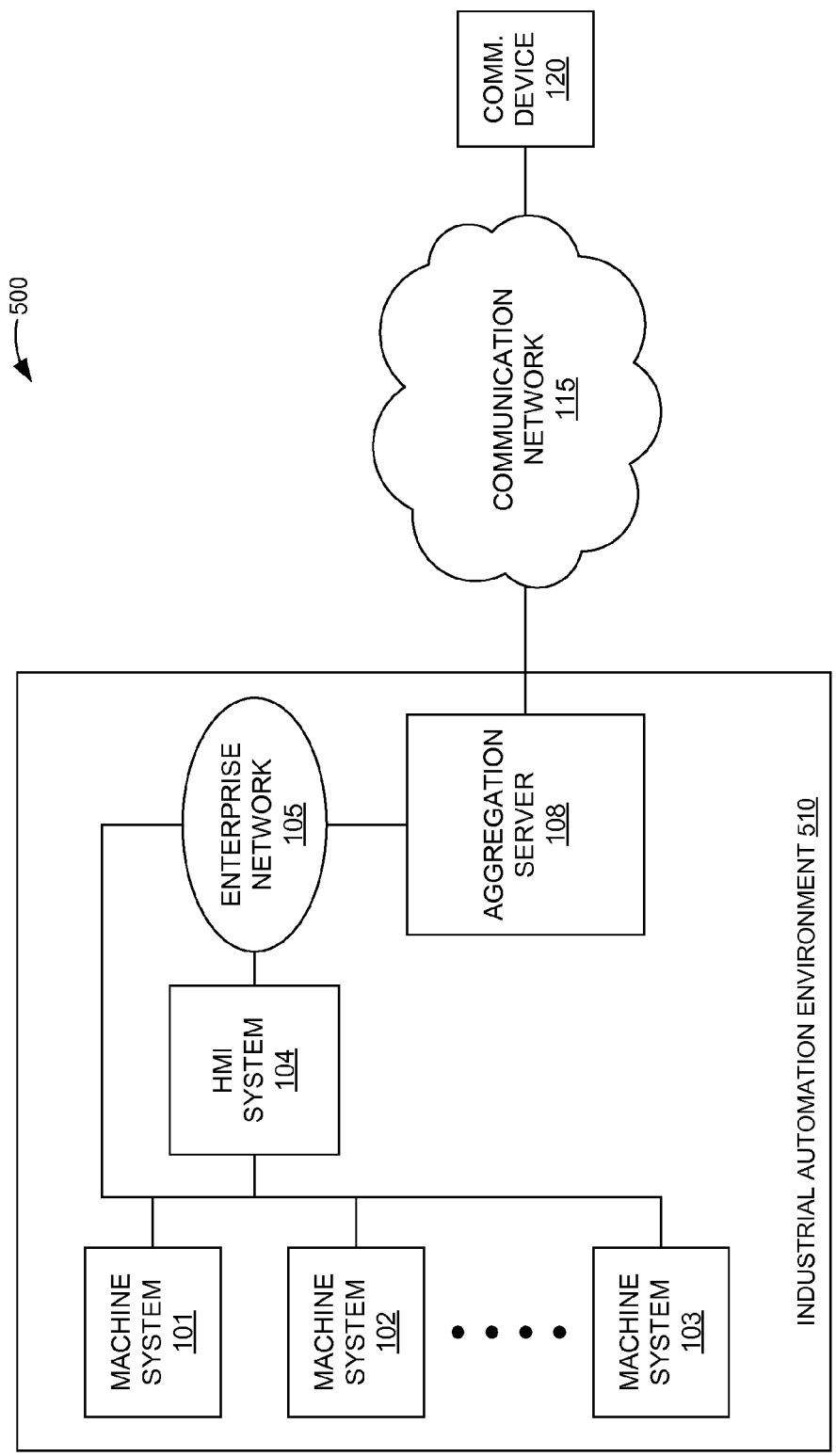
FIG. 5 is a block diagram illustrating a data aggregation system.

FIG. 5 is a block diagram illustrating data aggregation system 500. Data aggregation system 500 comprises machine systems 101-103, Human-Machine Interface (HMI) system 104, enterprise network 105, aggregation server 108, communication network 115, and communication device 120. The number of machine systems, HMI systems, and communication devices shown in FIG. 5 has been restricted for clarity, but there would typically be many more. Machine systems 101-103, HMI system 104, and aggregation server 108 communicate over enterprise network 105. Aggregation server 108 and communication device 120 communicate over communication network 115.

Industrial automation environment 510 includes machine systems 101-103, HMI system 104, enterprise network 105, and aggregation server 108. Industrial automation environment 510 comprises an automobile manufacturing factory, food processing plant, microprocessor fabrication facility, or some other type of industrial enterprise. Note that aggregation server 108 may not be located at the same physical premises as machine systems 101-103, but may be in communication with machine systems 101-103 and HMI system 104 over enterprise network 105 from many miles away.

Machine systems 101-103 continually produce operation data over time. Machine systems 101-103 are in communication with HMI system 104 and continually transfer the operation data to HMI system 104 over wireless links, metallic links, optical links, or some other communication link, including combinations thereof. In addition, machine systems 101-103 are in communication with aggregation server 108 and transfer the operation data to aggregation server 108 over enterprise network 105 on demand.

Machine systems 101-103 and HMI system 104 communicate with aggregation server 108 over enterprise network 105. Aggregation server 108 receives operation data from machine systems 101-103 and HMI system 104 over enterprise network 105 on demand. Aggregation server 108 also receives graphics data from HMI system 104 over enterprise network 105 on demand.

Figure 6:
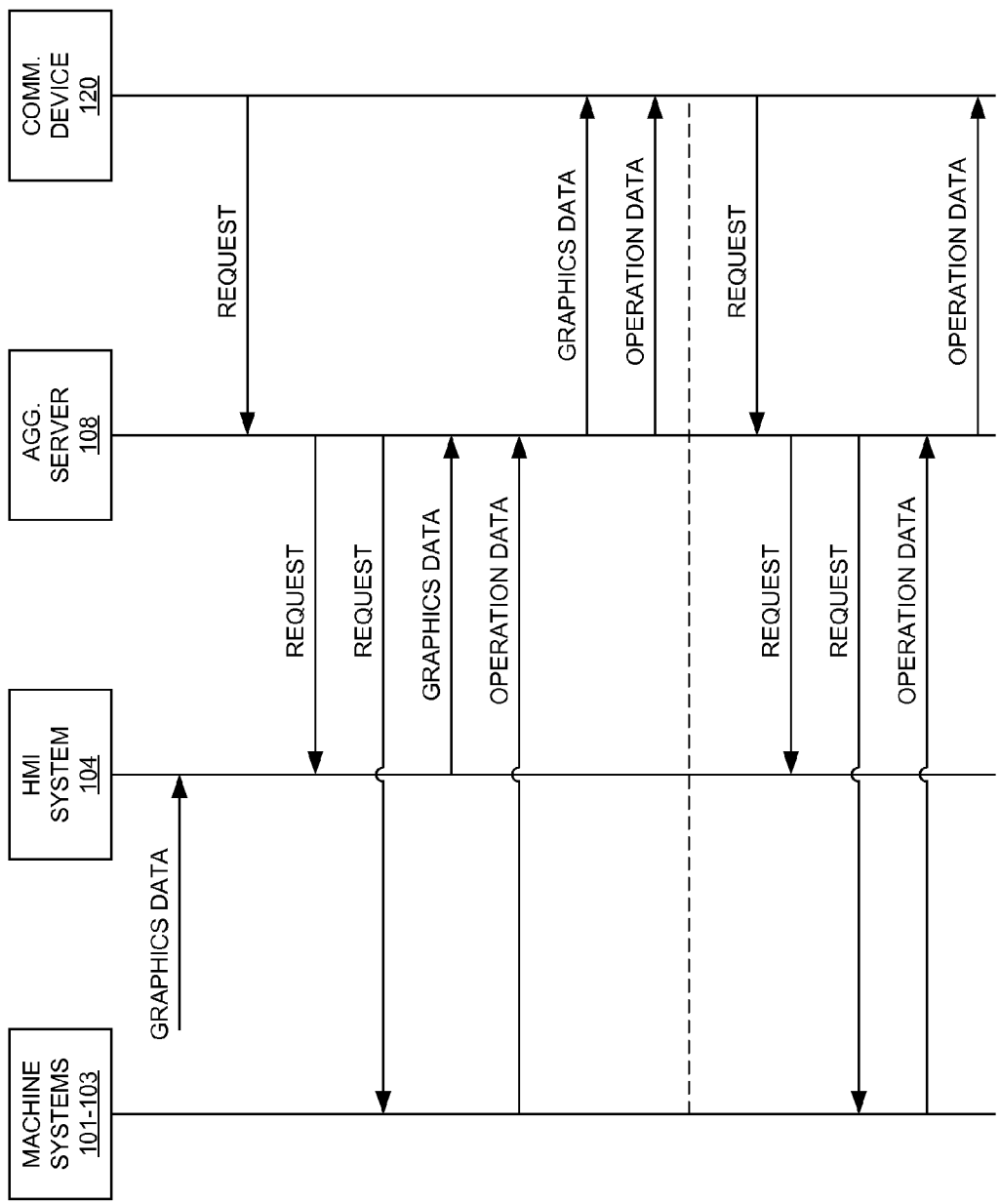
FIG. 6 is a sequence diagram illustrating a method of operating a data aggregation system.

FIG. 6 is a sequence diagram illustrating a method of operating data aggregation system 500. HMI system 104 receives graphics data in a variety of ways. For example, HMI system 104 might have various programmed display configurations representing different views of industrial automation environment 510 and machine systems 101-103. An operator of HMI system 104 might change a display configuration on HMI system 104. In another example, an operator might change the display configuration of HMI system 104 using communication device 120. In the examples listed above, HMI system 104 receives graphics data when an operator changes a display configuration of HMI system 104.

A user desires to conveniently view graphics data and operation data from a remote communication device. The user operates communication device 120 to request a viewing session from aggregation server 108. In response to the request for the viewing session, aggregation server 108 requests graphics data from HMI system 104. In addition, aggregation server 108 requests operation data from machine system 101-103. In response to the request for the graphics data, HMI system 104 sends the graphics data to aggregation server 108. In response to the request for the operation data, machine systems 101-103 transfer the operation data to aggregation server 108. Aggregation server 108 then transfers the graphics data and the operation data to communication device 120.

At a later point in time (represented by the dashed line in FIG. 6), the user operates communication device 120 to request a viewing session from aggregation server 108. In response to the request for the viewing session, aggregation server 108 requests updated graphics data from HMI system 104. However, in this example, the graphics data has not changed since aggregation server 108 last received the graphics data, so HMI system 104 does not send graphics data to aggregation server 108 at this time.

Also in response to the request for the viewing session, aggregation server 108 requests updated operation data from machine systems 101-103. Since machine systems 101-103 have generated new operation data, machine systems 101-103 transfer the new operation data to aggregation server 108. Aggregation server 108 then transfers the new operation data to communication device 120.

Figure 7:
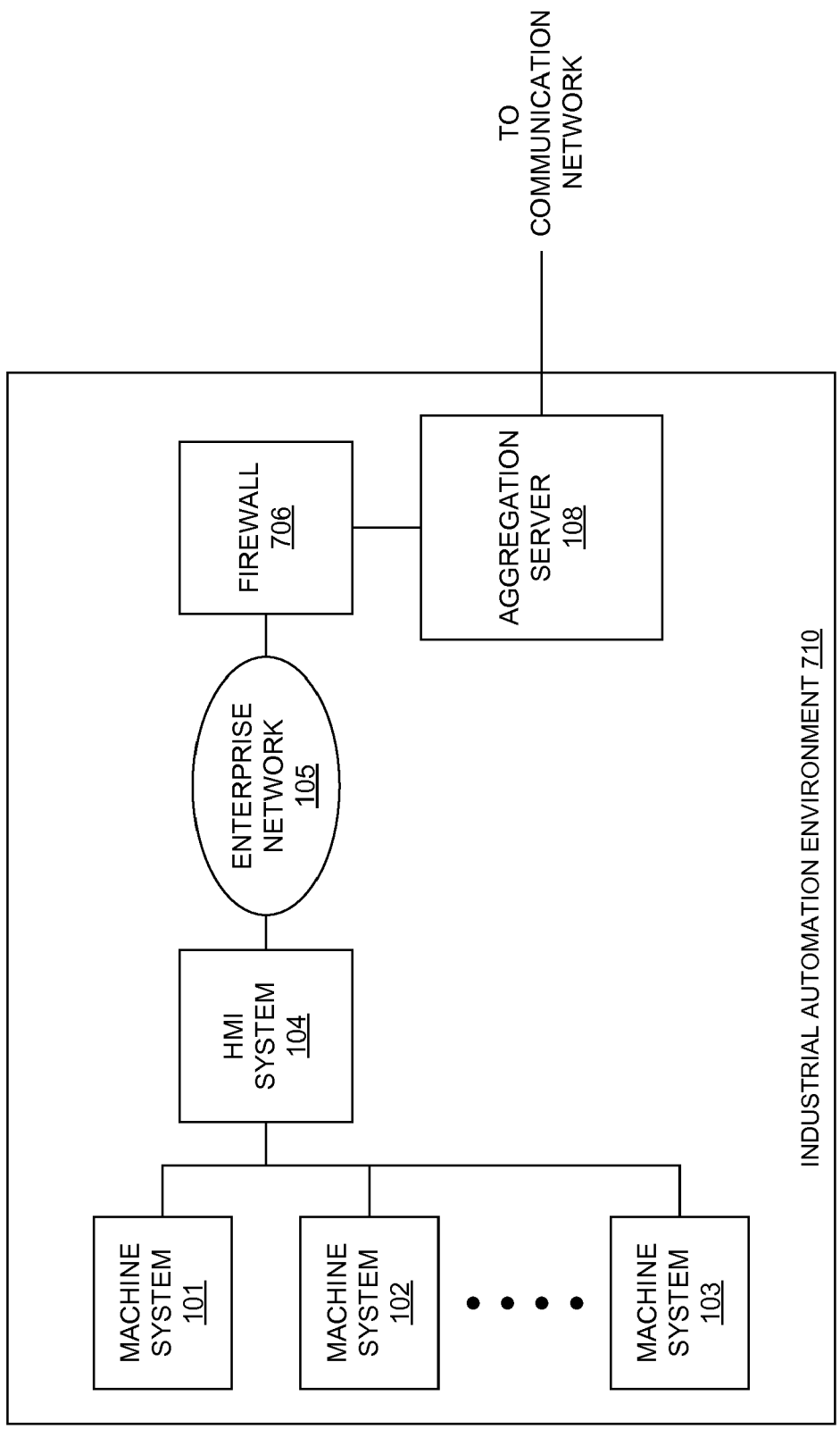
FIG. 7 is a block diagram illustrating an industrial automation environment.

FIG. 7 is a block diagram illustrating industrial automation environment 710. Industrial automation environment 710 comprises machine systems 101-103, Human-Machine Interface (HMI) system 104, enterprise network 105, firewall 706, and aggregation server 108. The number of machine systems and HMI systems shown in FIG. 7 has been restricted for clarity, but there would typically be many more. Industrial automation environment 710 comprises an automobile manufacturing factory, food processing plant, microprocessor fabrication facility, or some other type of industrial enterprise. Note that aggregation server 108 and firewall 706 may not be located at the same physical premises as machine systems 101-103, but may be in communication with HMI system 104 over enterprise network 105 from many miles away.

HMI system 104 communicates with aggregation server 108 over enterprise network 105 through firewall 706. Aggregation server 108 communicates with one or more communication devices, such as communication device 120, over a communication network, such as communication network 115.

Firewall 706 is capable of permitting, denying, encrypting, or decrypting all network traffic to and from enterprise network 105 based upon a set of rules and other criteria. Firewall 706 comprises computer and communication equipment and software. Firewall 706 allows aggregation server 108 to access enterprise network 105, which is in communication with HMI system 104. Firewall 706 forces a communication device such as communication device 120 through aggregation server 108, and prevents such a communication device from accessing enterprise network 105 and HMI system 104.

Firewall 706 could also be placed between enterprise network 105 and aggregation server 108 in industrial automation environment 510 of FIG. 5. In this case, firewall 706 would prevent communication device 120 from accessing machine systems 101-103 and HMI system 104 through enterprise network 105.

Firewall 706 comprises a communication interface and a processing system. The processing system includes a storage system. The storage system stores software. The processing system is linked to the communication interface. Firewall 706 could be comprised of a programmed general-purpose computer, although those skilled in the art will appreciate that programmable or special purpose circuitry and equipment may be used.

The communication interface could comprise a network interface, modem, port, transceiver, or some other communication device. The processing system could comprise a computer microprocessor, logic circuit, or some other processing device. The storage system could comprise a disk, integrated circuit, server, or some other memory device. The above-described components of firewall 706 may be integrated together or distributed among multiple devices.

The processing system retrieves and executes the software from the storage system. The software may comprise an operating system, utilities, drivers, networking software, and other software typically loaded onto a computer system. The software could comprise an application program, firmware, or some other form of machine-readable processing instructions. When executed by the processing system, the software directs firewall 706 to operate as described herein.

Advantageously, a user of communication device 120 is able to easily request and receive graphics data and operation data without directly communicating with machine systems 101-103 and HMI system 104. By placing aggregation server 108 in communication with HMI system 104 and machine systems 101-103 to request data generated by such systems, requests for operation data and graphics data from remote communication devices are serviced by aggregation server 108. Upon receiving a request for operation data and graphics data from communication device 120, aggregation server 108 requests such data from HMI system 104 or machine systems 101-103. Any subsequent requests for the data from other communication devices are serviced by aggregation server 108. Thus, by utilizing aggregation server 108, HMI system 104 and machine systems 101-103 may not be required to provide such data to communication devices on demand. By utilizing firewall 706, communication device 120 is prevented from accessing enterprise network 105. Thus, strain on enterprise network 105 resources is reduced through use of firewall 706 and aggregation server 108.

The above description and associated drawings teach the best mode of the invention. The following claims specify the scope of the invention. Some aspects of the best mode may not fall within the scope of the invention as specified by the claims. Also, while the preceding discussion describes embodiments employed specifically in conjunction with the monitoring and analysis of industrial processes, other applications, such as the mathematical modeling or monitoring of any man-made or naturally-existing system, may benefit from use of the concepts discussed above. Further, those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a human-machine-interface (HMI) system within an industrial automation environment, the method comprising:
   receiving a request for a remote viewing session generated by a communication device;
   in response to the request, transferring graphics data and operation data for delivery to and display by the communication device;
   monitoring for changes to the graphics data and the operation data during the remote viewing session;
   upon a change occurring to the graphics data, transferring updated graphics data for delivery to and display by the communication device; and,
   upon a change occurring to the operation data, transferring updated operation data for delivery to and display by the communication device.

2. The method of claim 1 further comprising receiving the operation data from a plurality of machine systems within the industrial automation environment, wherein the operation data corresponds to the operation of the machine systems.

3. The method of claim 1 further comprising stopping the monitoring for the changes to the graphics data and the operation data upon termination of the remote viewing session.

4. The method of claim 3 further comprising receiving information indicating when the communication device initiates the remote viewing session and when the communication device terminates the remote viewing session.

5. The method of claim 1 wherein the HMI system comprises a display device, and wherein the method further comprises displaying the graphics data and the operation data on the display screen simultaneously with displaying the graphics data and the operation data on the communication device.

6. The method of claim 5 wherein the HMI system further comprises a display configuration governing display of the graphics data on the display device, and wherein monitoring for the changes to the graphics data and the operation data during the remote viewing session comprises monitoring for changes made to the display configuration by an operator of the HMI system.

7. The method of claim 5 wherein the HMI system further comprises a display configuration governing display of the graphics data on the display device, and wherein monitoring for the changes to the graphics data and the operation data during the remote viewing session comprises monitoring for changes made to the display configuration by an operator of the communication device.

8. A human-machine-interface (HMI) system comprising:
   a machine interface configured to receive operation data from a plurality of machines within an industrial automation environment, wherein the operation data corresponds to operations of the plurality of machines;
   a communication interface configured to receive a request for a remote viewing session from a communication device, and in response to the request, transfer graphics data and the operation data for delivery to and display by the communication device; and,
   a processing system configured to monitor for changes to the graphics data and the operation data during the remote viewing session;
   wherein the communication interface is further configured to, upon a change occurring to the graphics data, transfer updated graphics data for delivery to and display by the communication device, and upon a change occurring to the operation data, transfer updated operation data for delivery to and display by the communication device.

9. The HMI system of claim 8 wherein the processing system is further configured to cease to monitor for the changes to the graphics data and the operation data upon termination of the remote viewing session.

10. The HMI system of claim 9 wherein the communication interface is further configured to receive information indicating when the communication device initiates the remote viewing session and when the communication device terminates the remote viewing session.

11. The HMI system of claim 8 further comprising a display device configured to display the graphics data and the operation data simultaneously with when the communication device displays the graphics data and the operation data.

12. The HMI system of claim 11 further comprising a display configuration governing display of the graphics data on the display device, and wherein to monitor for the changes to the graphics data and the operation data during the remote viewing session, the processing system monitors for changes made to the display configuration by an operator of the HMI system.

13. The HMI system of claim 11 further comprising a display configuration governing display of the graphics data on the display device, and wherein to monitor for the changes to the graphics data and the operation data during the remote viewing session, the processing system monitors for changes made to the display configuration by an operator of the communication device.

14. A human-machine-interface (HMI) product, for operating an HMI system, comprises machine-readable processing instructions that when executed by the HMI system, direct the HMI system to:
   receive operation data from a plurality of machines within an industrial automation environment, wherein the operation data corresponds to operations of the plurality of machines;
   receive a request for a remote viewing session from a communication device, and in response to the request, transfer graphics data and the operation data for delivery to and display by the communication device;
   monitor for changes to the graphics data and the operation data during the remote viewing session;
   upon a change occurring to the graphics data, transfer updated graphics data for delivery to and display by the communication device; and,
   upon a change occurring to the operation data, transfer updated operation data for delivery to and display by the communication device.

15. The HMI product of claim 14 further comprising a non-transitory memory device having the machine-readable processing instructions stored thereon.

16. The HMI product of claim 14 wherein the machine-readable processing instructions further direct the HMI system to cease to monitor for the changes to the graphics data and the operation data upon termination of the remote viewing session.

17. The HMI product of claim 16 wherein the machine-readable processing instructions further direct the HMI system to receive information indicating when the communication device initiates the remote viewing session and when the communication device terminates the remote viewing session.

18. The HMI product of claim 14 wherein the machine-readable processing instructions further direct the HMI system to display the graphics data and the operation data on a display device simultaneously with when the communication device displays the graphics data and the operation data.

19. The HMI product of claim 18 further comprising a display configuration governing display of the graphics data on the display device, and wherein to monitor for the changes to the graphics data and the operation data during the remote viewing session, the machine-readable processing instructions direct the HMI system to monitor for changes made to the display configuration by an operator of the HMI system.

20. The HMI product of claim 19 wherein to monitor for the changes to the graphics data and the operation data during the remote viewing session, the machine-readable processing instructions direct the HMI system to monitor for changes made to the display configuration by an operator of the communication device.

* * * * *